United States Patent [19]

Schuette et al.

[11] Patent Number: 4,839,319

[45] Date of Patent: Jun. 13, 1989

[54] HYDROCARBON CRACKING CATALYSTS AND PROCESSES FOR UTILIZING THE SAME

[75] Inventors: William L. Schuette; Lloyd A. Pine, both of Baton Rouge, La.

[73] Assignee: Exxon Research and Engineering Company, Florham Park, N.J.

[21] Appl. No.: 86,384

[22] Filed: Aug. 17, 1987

Related U.S. Application Data

[63] Continuation-in-part of Ser. No. 884,522, Jul. 11, 1986, abandoned.

[51] Int. Cl.$^4$ ............................................. B01J 29/08
[52] U.S. Cl. ........................................ 502/64; 502/79
[58] Field of Search ........................... 502/79, 64, 214; 208/114

[56] References Cited

U.S. PATENT DOCUMENTS

| | | | |
|---|---|---|---|
| 3,354,096 | 11/1967 | Young | 502/73 |
| 4,454,241 | 6/1984 | Pine et al. | 502/214 |
| 4,567,152 | 1/1986 | Pine | 502/64 |
| 4,584,091 | 4/1986 | Pine | 502/64 |
| 4,605,637 | 8/1986 | Chang et al. | 502/64 |
| 4,650,783 | 3/1987 | Chao et al. | 502/214 |

*Primary Examiner*—Carl F. Dees
*Attorney, Agent, or Firm*—Henry E. Naylor

[57] ABSTRACT

A catalyst is provided which comprises a phosphorus-treated ultrastable Y-type crystalline zeolite and a non-zeolitic inorganic oxide matrix. A catalytic cracking process utilizing the catalyst is also provided.

9 Claims, No Drawings

HYDROCARBON CRACKING CATALYSTS AND PROCESSES FOR UTILIZING THE SAME

CROSS-REFERENCE TO RELATED APPLICATION

This is a continuation-in-part application of U.S. Ser. No. 884,522, filed July 11, 1986 now abandoned.

BACKGROUND OF THE INVENTION

1. Field of the Invention

The present invention relates to a catalyst and its use in a catalytic cracking process. More particularly, the present invention relates to a cracking catalyst that minimizes coke production.

2. Description of Information Disclosures

Hydrocarbon cracking catalysts comprising a zeolite and discrete particles of phosphorus-treated alumina dispersed in an inorganic oxide matrix are known. See, for example, U.S. Pat. No. 4,567,152.

U.S. Pat. No. 4,456,780 discloses a hydrocarbon disproportionation process using a zeolite having a silica to alumina ratio of at least 12 Which has been pretreated with a phosphorus-containing compound and Which may additionally have been steamed prior to said treatment.

U.S. Pat. No. 4,454,241 discloses a phosphorus-containing zeolitic catalyst made from a clay starting material. The catalyst is obtained by contacting a partially cation exchanged calcium zeolite-containing catalyst with a dihydrogen phosphate anion, e.g., ammonium hydrogen phosphate or dihydrogen phosphite anion.

U.S. Pat. No. 4,430,199 discloses passivation of contaminant metals on cracking catalyst by phosphorus addition. The phosphorus compound may be ammonium hydrogen phosphate. The phosphorus compound may be impregnated on an inert carrier such as calcined metakaolin clay that can be blended with the catalyst or added to the catalyst. See column 3, lines 17 to 20, and column 10, lines 20 to 25.

It has now been found that a catalytic cracking process utilizing catalysts comprising zeolites that have been pretreated with certain phosphorus compounds will produce less coke and gas relative to utilizing the same catalyst that does not comprise a phosphorus-treated zeolite.

SUMMARY OF THE INVENTION

In accordance with the invention there is provided, a catalyst comprising (a) a non-zeolitic inorganic oxide matrix, and (b) an ultrastable Y-type crystalline zeolite, said zeolite having been pretreated by contacting said zeolite with a phosphorus compound selected from the group consisting of phosphoric acid, phosphorous acid, a salt of phosphoric acid, a salt of phosphorous acid and mixtures thereof for a time sufficient to composite an effective amount of phosphorus with said zeolite.

Furthermore, in accordance with the invention, there is also provided a catalytic cracking process utilizing the above-stated catalyst.

DETAILED DESCRIPTION OF THE INVENTION

The catalyst of the invention comprises a phosphorus treated ultrastble Y-type zeolite and a non-zeolitic inorganic oxide matrix.

THE ZEOLITE COMPONENT

Suitable zeolites for use as component of the catalyst of the present invention are ultrastable Y-type zeolites described, for example, in U.S. Pat. No. Re. 28,629 (Reissue of U.S. Pat. No. 3,402,996); U.S. Pat. Nos. 4,036,739; 3,781,199, the teachings of which are hereby incorporated by reference. In general "ultrastable" with reference to a Y-type zeolite refers to a zeolite which is resistant to degradation of crystallinity by high temperature and steam treatment and which has a unit cell size not greater than about 24.5 Angstroms and a low alkali metal content. The silica to alumina mole ratio of ultrastable Y-type zeolites is at least about 3:1. The ultrastable Y-type zeolite may be ion exchanged with various cations such as rare earth metals, calcium, magnesium, hydrogen, hydrogen precursors and mixtures thereof as is known in the art. The concentration of hydrogen cation in the finished zeolite will be that concentration equivalent to the difference between the theoretical cation concentration of the particular zeolite and the amount of cation present in he form of exchanged metal cation and a residual alkali metal cation. The final zeolite may be composited with other catalytic metal components, such as metals of Groups IIA, IIIA, IB, IIB, IIIB, IVB, VIII of the Periodic Table of Elements by vapor phase deposition, impregnation, etc. The Periodic Table of Elements referred to herein is given in *The Handbook of Chemistry and Physics,* published by The Chemical Rubber Publishing Company, Cleveland, Ohio, 45th Edition, 1964. The particle size of the zeolite component may range from about 0.1 to 10 microns, preferably from about 0.5 to 3 microns. Suitable amounts of zeolite component in the total catalyst will range from about 1 to about 60, preferably from about 1 to about 40, more preferably from about 5 to about 40 wt % based on the total catalyst. The zeolite is contacted with the phosphorus compound for a time sufficient to composite an effective amount of phosphorus with the zeolite. By "effective amount" is intended herein that use of a catalyst containing the phosphorus-treated zeolite will produce less coke and gas than the same catalyst containing the same components but in which the zeolite has not been treated with the phosphorus compound. Suitable phosphorus compounds include phosphoric acid ($H_3PO_4$), phosphorous acid ($H_3PO_3$), salts of phosphoric acid, salts of phosphorous acid and mixtures thereof. Although any soluble salt of phosphoric acid or phosphorous acid such as alkali metal salts and ammonium salts may be used, it is preferable to use ammonium salts. Preferred phosphorous-containing compounds are monoammonium phosphate ($NH_4)H_2PO_4$, diammonium phosphate $(NH_4)_2HPO_3$; monoammonium phosphite $(NH_4)H_2PO_3$, diammonium phosphite $(NH_4)_2HPO_3$, and mixtures thereof. Suitable amounts of phosphorus to be incorporated with the zeolite include at least about 0.1 wt %, generally from about 0.1 to 10 wt %, preferably at least about 0.2 wt %, more preferably from about 0.5 to 5 wt %, calculated as elemental phosphorus, based on the weight of the zeolite. Contact of the zeolite with a liquid medium (such as water) comprising the phosphorus compound is suitably conducted at a pH ranging from about 2.0 to about 8.0. Suitable concentrations of the phosphorus compound in the liquid medium may range from about 0.05 to about 5 wt %. Treating times and temperatures are not critical and may range from about ambient temperature, that is, from about 60° F. to about 250° F. The phosphorus-treated zeolite is recovered from the liquid medium (dried, for example, at a temperature of about 800° F. for about 2 hrs.). Preferably, prior to contacting the zeolite with a phosphorus compound, the zeolite may be steam-treated by subjecting the zeolite to an atmosphere comprising from about 5% to 100% steam, at a temperature ranging from about 1000° to about 1600° F. for a period of time ranging from about 15 minutes to about 100 hours. The pressure is not critical and may vary widely.

THE INORGANIC OXIDE MATRIX COMPONENT

The inorganic oxide matrices suitable as component of the catalyst of the present invention are non-zeolitic inorganic oxides, such as silica, alumina, silica-alumina, magnesia, boria, titania, zirconia and mixtures thereof. The matrices may include one or more of various known clays, such as montmorillonite, kaolin, halloysite, bentonite, attapulgite and the like. Preferably, the inorganic oxide is a silica-containing matrix comprising a major amount of silica and a minor amount of an oxide of at least one metal of Groups IIA, IIIA, IVB of the Periodic Table of Elements. Most preferably, the inorganic oxide will be a non-zeolitic silica alumina. Suitable matrices include the type of matrices prepared from a sol such as described in U.S. Pat. Nos. 3,867,308; 3,957,689; and 4,458,023. The matrix component may be present in the catalyst of the present invention in an amount ranging from about 40 to about 99 wt %, preferably from about 50 to about 80 wt %, based on the total catalyst. It is also within the scope of the invention to incorporate in the catalyst other materials to be employed in cracking catalysts such as various types of zeolites, clays, carbon monoxide oxidation promoters, etc.

CATALYST PREPARATION

The catalyst of the present invention may be prepared by any one of several methods. The preferred method of preparing one of the catalyst of the present invention, that is, a catalyst comprising a silica-alumina matrix and phosphorus-treated zeolite is to react sodium silicate with a solution of sulfuric acid and aluminum sulfate to form a silica-alumina sol. The phosphorus-treated zeolite component is added to this blend. Clay, alumina, silica, and other materials may be added to this blend, if desired. The zeolite is an ultrastable Y-type zeolite having a unit cell size below about 24.5 Angstroms. A sufficient amount of each component is utilized to give the desired final composition. The resulting mixture is then sprayed dried to produce dried solids. The dried solids are subsequently reslurried in water and washed substantially free of undesired soluble salts. The catalyst is then dried to a residual water content of less than about 15 wt %. The dried catalyst is recovered. The catalyst is suited for catalytic cracking of hydrocarbons.

Catalytic cracking with the catalyst of the present invention can be conducted in any conventional catalytic cracking manner. Suitable catalytic cracking conditions include a temperature ranging from about 700° to about 1300° F. and a pressure ranging from about subatmospheric to several hundreds of atmospheres, typically from about atmospheric to about 100 psig. The process may be carried out in a fixed bed, moving bed, ebullating bed, slurry, transfer line or fluidized bed operation. The catalyst of the present invention can be used to convert any of the conventional hydrocarbon feeds used in catalytic cracking, that is, it can be used to crack naphthas, gas oils and residual oils having a high content of metallic contaminants. It is especially suited for cracking hydrocarbons boiling in the gas oil range, that is, hydrocarbon oils having an atmospheric pressure boiling point ranging from about 450° to about 1100° F. to yield products having a lower boiling point while producing less coke and gas.

DESCRIPTION OF THE PREFERRED EMBODIMENT

The following examples are presented to illustrate the invention.

Catalysts of the invention and comparative catalysts were prepared and tested for cracking activity in a standard microactivity test (MAT) described in the *Oil and Gas Journal*, 1966, Vol. 64, pages 7, 84, 85 and Nov. 22, 1971, pages 60–68. The hydrocarbonaceous oil feedstocks used herein, designated Feedstock No. 1 and Feedstock No. 2, have the following characteristics:

|  | Feedstock No. 1 | Feedstock No. 2 |
|---|---|---|
| Gravity, °API at 60° | 26.2 | 22.5 |
| Distillation, °F. | | |
| IBP | 583 | N.A. |
| 5% | 594 | 640 |
| 50% | 705 | 822 |
| 95% | 786 | — |
| FBP | 802 | 995 |

EXAMPLE

A sample of ultrastable Y-type zeolite was steamed at 1400° F. for 16 hours and one atmosphere of steam partial pressure. Thirty grams of the steamed zeolite was then treated with an aqueous solution containing 66.7 grams of monoammonium phosphate (MAP) in 1000 cc of H$_2$O for 2 hours at 150° F. The treated zeolite was dried and calcined for 2 hours at 1000° F. The MAP treated zeolite was then blended with sufficient silica-alumina gel (25 wt % alumina) to prepare a catalyst containing 40 wt % MAP-treated steamed zeolite, 60 wt % and silica-alumina gel. This catalyst is, herein, designated catalyst A. Another catalyst, designated Catalyst B, was prepared in accordance with the procedure for catalyst A hereof. A comparative catalyst, herein designated catalyst C, was made the same way with the same components except that the zeolite was not treated with MAP. All three catalysts were steamed at 1400° F. for 16 hours at one atmosphere steam partial pressure to simulate equilibration in a commercial regenerator. The three catalysts were tested in a microactivity test (MAT) using Feedstock No. 1 and Feedstock No. 2. The MAT results are given in Table I.

TABLE I

| | Catalyst of the Invention | | |
|---|---|---|---|
| | Catalyst A | Catalyst B | Catalyst C |
| Feedstock No. 1 | | | |
| MAT | | | |
| [(1)]Conversion, LV % | 62.8 | 63.9 | 65.8 |
| C, wt. % | 1.31 | 1.36 | 1.55 |
| H$_2$, wt % × 100 | 3.1 | 2.9 | 3.3 |
| Feedstock No. 2 | | | |
| MAT | | | |
| [(1)]Conversion, LV % | 74.0 | 74.1 | 75.3 |

TABLE I-continued

| | Catalyst of the Invention | | |
|---|---|---|---|
| | Catalyst A | Catalyst B | Catalyst C |
| C, wt % | 2.69 | 2.97 | 3.76 |
| $H_2$, wt % × 100 | 4.7 | 4.4 | 4.1 |

[1] Conversion to 400° F.

As can be seen from Table I, the tests using catalysts A and B of this invention gave less coke than the test using catalyst C.

What is claimed is:

1. A catalyst comprising: (a) a non-zeolitic inorganic oxide matrix, and (b) an ultrastable Y-type crystalline zeolite, said zeolite having been pretreated by contacting said zeolite with a phosphorus compound selected rom the group consisting of phosphoric acid, phosphorous acid, a salt of phosphoric acid, a salt of phosphorous acid, and mixtures thereof for a time sufficient to composite an effective amount of phosphorus with said zeolite.

2. The catalyst of claim 1 wherein said zeolite is contacted with steam before being contacted with said phosphorus compound.

3. The catalyst of claim 2 wherein said zeolite is subjected to an atmosphere comprising from about 5 mole percent to about 100 mole percent steam at a temperature ranging from about 1000° to about 1600° F.

4. The catalyst of claim 1 wherein said phosphorus compound is selected from the group consisting of an ammonium salt of phosphoric acid, an ammonium salt of phosphorous acid and mixtures thereof.

5. The catalyst of claim 1 wherein said phosphorus is composited with said zeolite in an amount of at least about 0.1 weight percent, based on the weight of the zeolite, calculated as elemental phosphorus.

6. The catalyst of claim 1 wherein said zeolite is an ultrastable Y zeolite having a unit cell size below about 24.5 Angstroms.

7. The catalyst of claim 1 wherein said matrix is selected from the group consisting of silica, alumina, silica-alumina, magnesia, zirconia, titania, boria, chromia and mixtures thereof.

8. The catalyst of claim 1 wherein said matrix comprises silica and alumina.

9. The catalyst of claim 1 wherein said zeolite is present in an amount ranging from about 1 to about 40 weight percent, and wherein said phosphorus is present in an amount ranging from about 0.5 to 5 weight percent based on said zeolite, and wherein said matrix comprises silica and alumina.

* * * * *